(12) United States Patent
Thompson et al.

(10) Patent No.: US 7,034,225 B2
(45) Date of Patent: Apr. 25, 2006

(54) APPARATUS THAT ENABLES LOW COST INSTALLATION OF A SECURE AND TAMPER PROOF ASSEMBLY THAT ACCOMMODATES LIFELINE SUPPORT FOR POWER LINE COMMUNICATION DEVICES

(76) Inventors: Scott Randall Thompson, HC 89 Box 69, Hermosa, SD (US) 57744-9701; Bernt Askild Askildsen, 1507 Plateau La., Rapid City, SD (US) 57703

( * ) Notice: Subject to any disclaimer, the term of this patent is extended or adjusted under 35 U.S.C. 154(b) by 4 days.

(21) Appl. No.: 10/906,864

(22) Filed: Mar. 9, 2005

(65) Prior Publication Data

US 2005/0200284 A1  Sep. 15, 2005

Related U.S. Application Data

(60) Provisional application No. 60/551,518, filed on Mar. 9, 2004.

(51) Int. Cl.
*H02G 3/14* (2006.01)
(52) U.S. Cl. ............................. 174/66; 174/67; 220/241
(58) Field of Classification Search ................ 174/66, 174/67, 135; 220/241, 242, 3.8
See application file for complete search history.

(56) References Cited

U.S. PATENT DOCUMENTS

| | | | |
|---|---|---|---|
| 3,949,172 A | 4/1976 | Brown et al. ............... 455/402 |
| 4,473,817 A | 9/1984 | Perkins ...................... 455/402 |
| 4,636,771 A | 1/1987 | Ochs .......................... 455/402 |
| 4,636,914 A | 1/1987 | Belli ........................... 361/600 |
| 4,750,094 A * | 6/1988 | Krasik ......................... 362/95 |
| 4,924,349 A | 5/1990 | Buehler et al. .............. 361/463 |
| 5,402,902 A | 4/1995 | Bouley ........................ 220/3.7 |
| 5,574,256 A * | 11/1996 | Cottone ........................ 174/53 |
| 6,147,304 A | 11/2000 | Doherty ....................... 174/48 |
| 6,150,609 A * | 11/2000 | Baldwin ....................... 174/66 |
| 6,172,301 B1 * | 1/2001 | Goodsell ...................... 174/66 |
| 6,207,899 B1 * | 3/2001 | Gillespie ...................... 174/66 |
| 6,281,439 B1 | 8/2001 | Reiker .......................... 174/51 |
| 6,441,304 B1 | 8/2002 | Currier et al. ................ 174/53 |
| 6,717,050 B1 | 4/2004 | Laflamme et al. ........... 220/3.2 |
| 6,723,921 B1 | 4/2004 | Vagedes ...................... 220/3.2 |
| 6,730,845 B1 | 5/2004 | Criniti et al. ................ 220/3.2 |
| 6,765,149 B1 | 7/2004 | Ku ............................... 200/297 |
| 6,797,883 B1 * | 9/2004 | Benson et al. ................ 174/66 |
| 6,806,425 B1 * | 10/2004 | O'Neill ........................ 174/66 |
| 6,838,997 B1 | 1/2005 | Davidson ..................... 361/600 |

* cited by examiner

*Primary Examiner*—Dhiru R. Patel

(57) ABSTRACT

A novel apparatus is disclosed that provides a secure, tamperproof, and cordless installation to securely and reliably couple any electronic device directly onto any standard power outlet. The installation is easy, certification free, and does not need to reduce the number of available power outlets. The apparatus also enables reliable and effective signal coupling for power line control and communication devices including X.10, HomePlug, and other proprietary power line based physical layers. For these types of systems the apparatus may provide life line support using a battery or any other form of energy storage. The device is optimally installed directly onto a standard wall outlet by replacing the current face plug with a housing that can be affixed directly onto the duplex outlet with screws that attach to any existing threaded hole used by conventional or other mounting devices within a wall box.

2 Claims, 5 Drawing Sheets

APPARATUS THAT ENABLES LOW COST INSTALLATION OF A SECURE AND TAMPER PROOF ASSEMBLY THAT ACCOMMODATES LIFELINE SUPPORT FOR POWER LINE COMMUNICATION DEVICES

CROSS-REFERENCE TO RELATED APPLICATIONS

Current U.S. Class: 200/297, 220/3.2, 455/402, 455/3.01
Intern'l Class: H01F 027/42, H02G 003/14
Field of Search: 174/48, 51, 53, 200/50.1, 50.14, 51.14, 297, 220/3.2, 3.3, 3,7, 307/149, 361/600, 601, 636, 643, 379/142.14, 455/3.01, 280, 402

STATEMENT REGARDING FEDERALLY SPONSORED RESEARCH OR DEVELOPMENT

None

REFERENCE TO SEQUENCE LISTING, A TABLE, OR A COMPUTER PROGRAM APPENDIX

None

BACKGROUND OF THE INVENTION

Power line based communication and control networks including but not limited to the existing HomePlug, X.10, and broadband access ponits have been entering the main stream market at a relatively slow rate. The technology adaptation cycle of these devices is slow due to stiff opposition from competing wireless technologies and limitations in the physical packaging of power line communication devices. Current indoor power line communication devices include units that require replacement of existing electrical outlets or simple devices that plug directly into the existing receptacle. The former provides a reliable connection at the expense of installation that requires professional assistance for most customers, which is the main limiting factor that inhibits widespread adoption of the technology. The latter is easy to install, however, this convenience is afforded at the expense of connection reliability. This drawback causes problems ranging from poor signal coupling to no signal coupling at all; particularly if the unit is accidentally removed from the wall or gradually pulled from the power receptacle because of cable tension. Competing wireless solutions are able to function reliably during power outages because the units can operate when they are plugged into a conventional uninterruptible power supply. By contrast, power line communication systems cannot pass signals through uninterruptible power supplies. Consequently it is expensive to maintain communications during power outages because some alternative form of power, other than low-cost conventional uninterruptible power supplies, must be provided to each unit in the building.

Prior art discloses three expired power line based voice and/or data communication system patents including U.S. Pat. No 3,949,172, U.S. Pat. No. 4,636,771, and U.S. Pat. No.: 4,473,817. The latter describes single phase power line signal coupling that enables any power line to be used as a communication link for any multi-media signal.

Recent prior art discloses different types of power outlet boxes including U.S. Pat. Nos. 4,636,914, 6,147,304, 6,281,439, and 6,441,304; face plate assemblies including U.S. Pat. Nos. 4,924,349 and 6,838,997; wall outlet box extensions including U.S. Pat. Nos. 6,723,921, 5,402,902 and 6,765,149; and mounting assemblies including U.S. Pat. Nos. 6,717,050 and 6,730,845. Prior art that discloses a tamper proof, securely fastened, life-line supported indoor power line communication apparatus that overcomes the above noted limiting technology adaptation factors does not exist.

BRIEF SUMMARY OF THE INVENTION

A novel securely fastened and tamper proof life-line supported indoor power line communication apparatus that overcomes the primary factors that limit adoption of the power line communication and control is disclosed. The power outlet faceplate is removed before the device is directly inserted into the power receptacle either by one or multiple plugs. It is securely fastened to any existing threaded hole or through hole in the power outlet box or power receptacle by using any threaded screws, barbed anchor, plastic anchor, other conventional mounting mechanisms, or any combination thereof. Tamper security is further enhanced by optional mechanisms that require a key to release the faceplate device or by a complete plastic assembly that is securely enclosed by a tamper proof faceplate screw, chemical adhesion, or any other mechanical means including pressure and heat. Life-line support is provided by a rechargeable backup battery or charge cell that is accessible through a lid that is located on the cover of the apparatus.

DETAILED DESCRIPTION OF THE INVENTION

Figure 10:
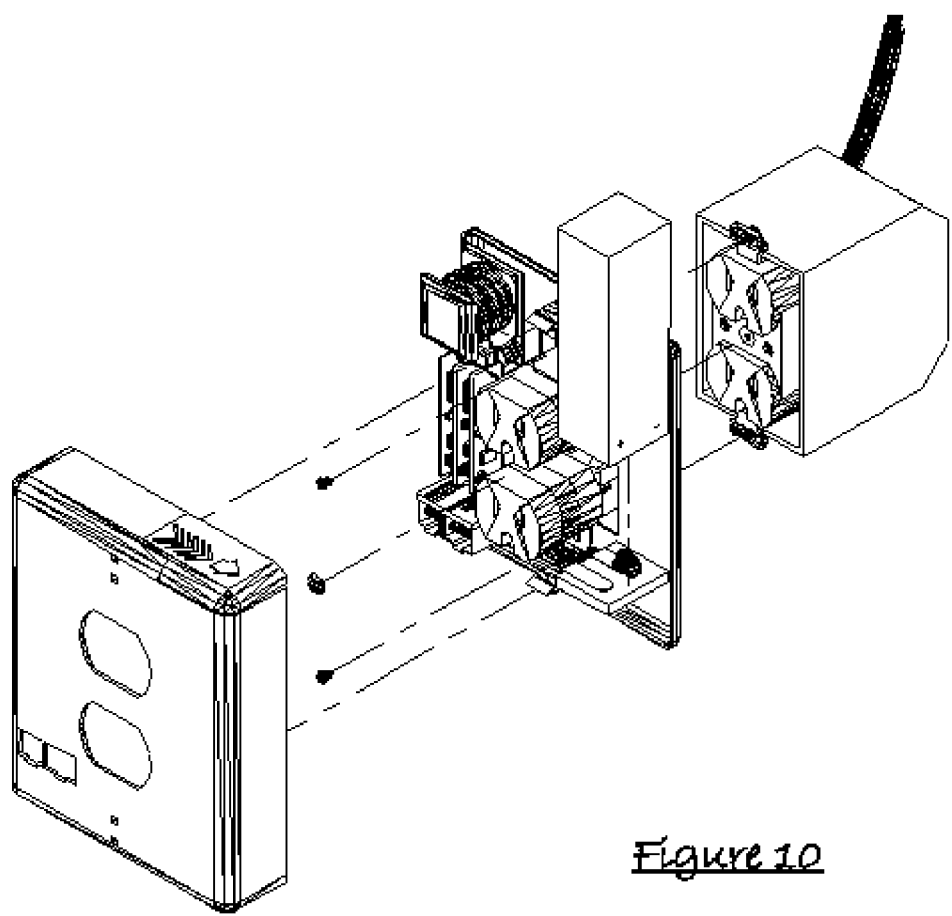
FIG. 10: Is an expanded prospective view of the embodied invention.

An expanded illustration of the embodied invention is shown in FIG. 10. This invention discloses the artwork, architecture, mechanical design, housing, ease of installation, and intended use of any assembly or device that plugs into any wall outlet for the purpose of supporting any form of power line control and communication over power lines including any form of data transfer and any form of multimedia such as audio, video, entertainment, telephone, and the like. The device is an enclosed apparatus that contains these components and the primary part that seeks protection in the method that the device installs, which offers considerable savings over any existing artwork or housing.

Figure 1:
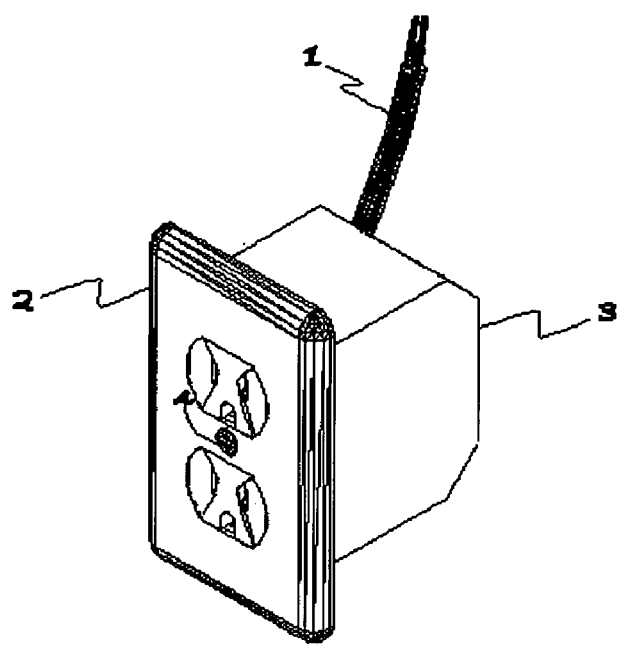
FIG. 1: Is an illustration of a conventional power receptacle that is covered by a faceplate.
Figure 2:
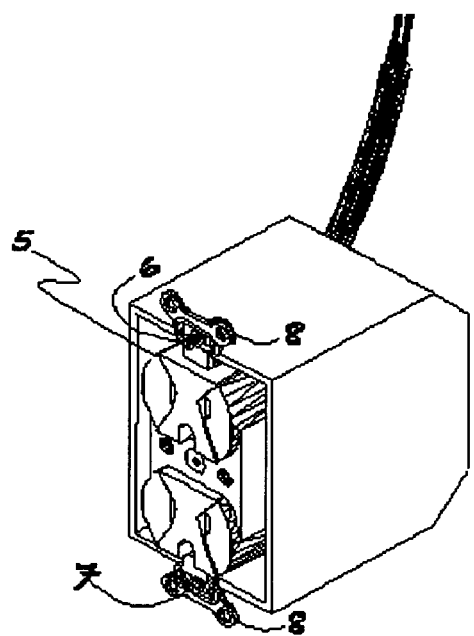
FIG. 2: Is an illustration of a conventional power receptacle with the faceplate removed.
Figure 3:
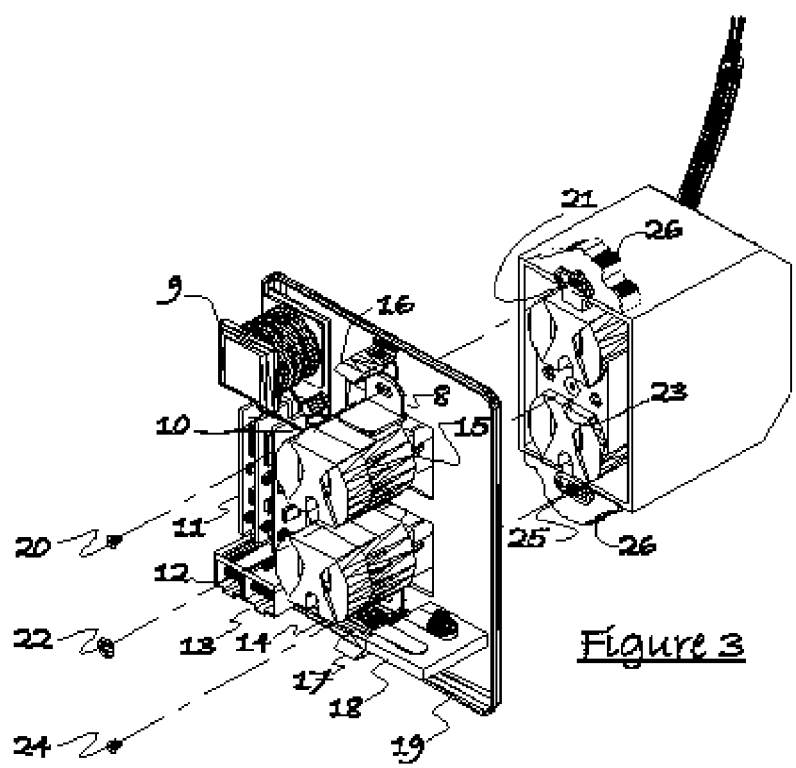
FIG. 3: Is an expanded illustration of the internal hardware and power extension.
Figure 4:
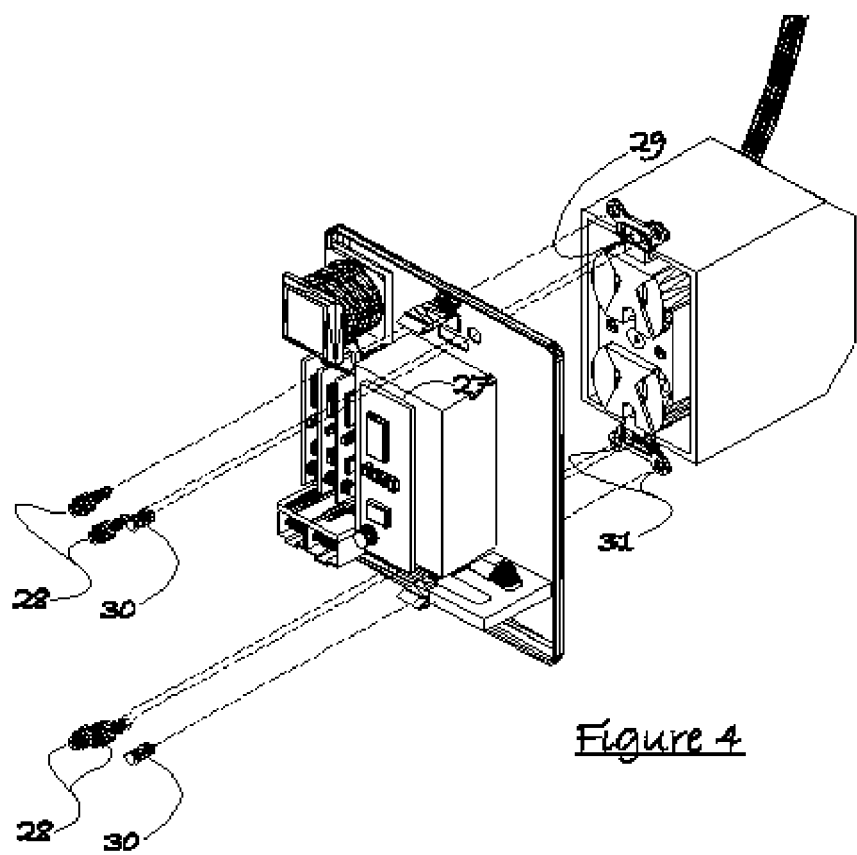
FIG. 4: Is an expanded illustration of the internal hardware without a power extension.

FIG. 1 shows a standard wall mounted power outlet consisting of the interior building wires that supply the outlet box 1, the power outlet receptacle faceplate 2, the outlet receptacle box 3, and face plate screw 4. The embodied invention is designed in part to replace the outlet receptacle faceplate 2, which must be removed during the first step of the installation process as shown in FIG. 2. The assembly is subsequently plugged directly into a conventional power receptacle of the type shown at 5, which is commonly mounted into the outlet box by the upper and lower screws shown at 6 and 7 in FIG. 2. The four through holes located at 8 in FIG. 2 are generally used to interface with the building material on the wall and are usually not used by the electrical device or by the faceplate and may be used to mount the embodied invention. The disclosed invention is mounted onto the outlet box after the face plate has been removed as shown in FIG. 2. The screw shown at 22 in FIG. 2 that is used to mount the embodied invention to the outlet receptacle 5 via the center threaded hole shown by example at 23 in FIG. 3 can be any screw. However, the method of installation is easiest when the screw has matching threads to the center screw hole 23 of the outlet receptacle. The screws shown at 20 and 24 in figure that affix the device to the wall box can be any screw of the type shown at 6 and 7 in FIG. 2. Installation is optimal if the screws shown at 20 and 24 have matching threads to the threaded holes in the outlet box at 21 and 25.

Figure 7:
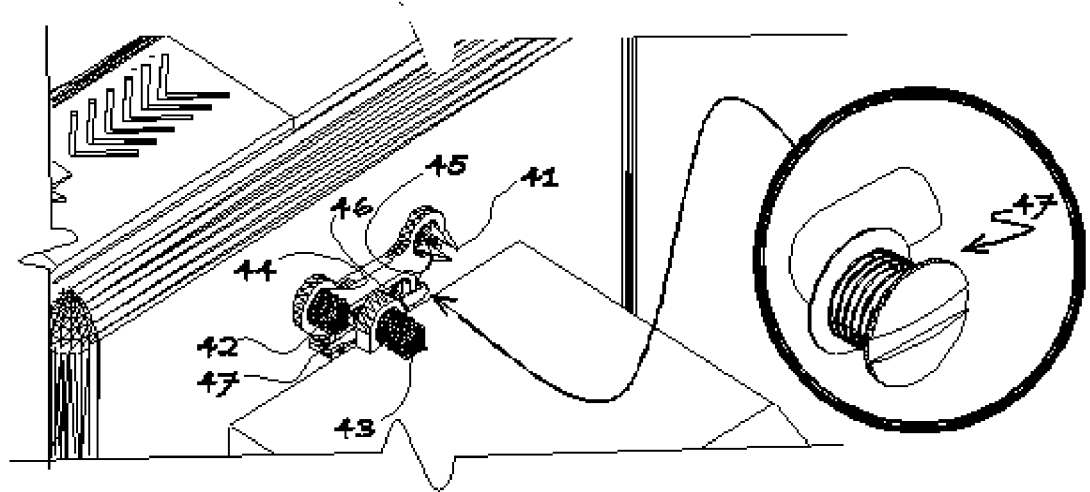
FIG. 7: Is a rear view illustration the snap-on mounting apparatus.

The embodied invention can be affixed to the outlet box 3 in the above described manner, by using snap-on mechanisms of the type shown at 28 and 41, barbed anchors of the type shown at 30, 42, 43, 49 and 52, spring loaded elbow clamps of the type shown at 47, or any other mechanical means including pressure, heat, or chemical adhesion or any combination thereof. Likewise, the internal components shown at 9, 10, 11, 12, 13, 14, 15, and 18 in FIG. 3 and the faceplates shown by example at 32 and 54 can be mounted to the back plates shown by example at 19 and 48 by using screws, snap-on mechanisms, barbed anchors, spring loaded elbow clamps, or any other mechanical means including pressure, heat, or chemical adhesion or any combination thereof. Likewise any fully enclosed assembly of the embodied invention like that shown by example in FIG. 8A, FIG. 8B, and FIG. 9 can be mounted to the receptacle using any of the above described methods or by applying sufficient pressure to the barbed anchors or snap-on connectors at 49 and 52 to ensure that the assembly tightly couples to the outlet box as shown in FIG. 7.

The list of components that are displayed in the drawings include a signal and low voltage transformer 9, transformer wires 10, supporting electronics 11, RJ-11 12 and RJ-45 13 communication jacks, power receptacle extensions at 14 and 15, an upper face plate snap-on clip 16, lower face plate snap-on clip 17, life line battery backup assembly 18, miscellaneous electronic hardware and printed circuit boards 27, upper receptacle screw 20, upper receptacle screw assembly 21, face plate screw 22, face plate screw assembly 23, lower receptacle screw assembly 24, lower receptacle screw 25, and a cut-out view of an unspecified building wall material to illustrate placement of the outlet box. These components are shown by example to illustrate the general concept of the embodied invention and are not intended to limit the components that can be housed by this invention. The RJ-11 and RJ-45 jacks are at 12 and 13 are presented in FIG. 3 only to illustrate placement of communication jacks that interface to conventional devices; this example does not limit the type of communication jacks that can be used by this invention or by the claims of this invention.

Figure 5:
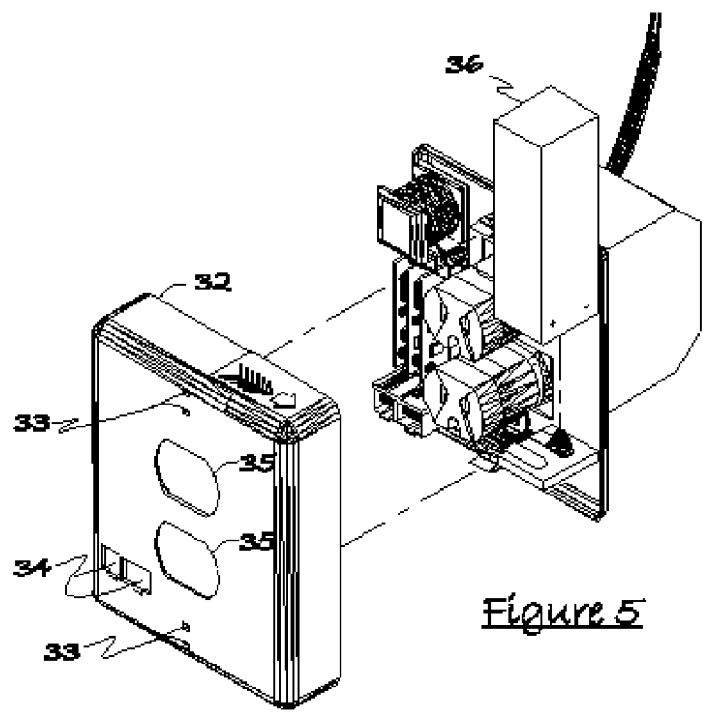
FIG. 5: Is an expanded illustration of the device face plate and the life-line support cell.
Figure 6A:
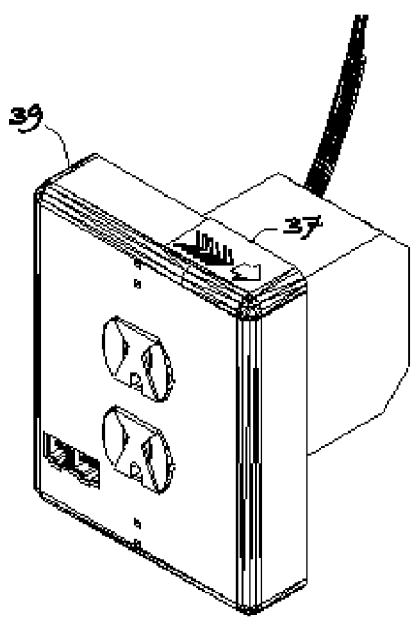
FIG. 6A: Is an illustration of a single receptacle assembly of the embodied invention.
Figure 6B:
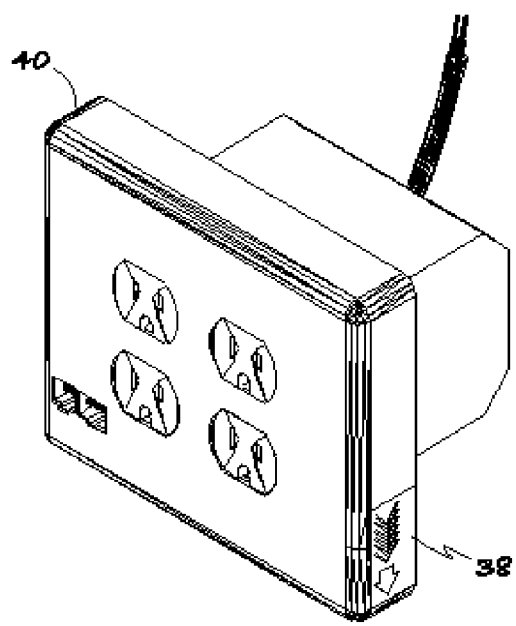
FIG. 6B: Is an illustration of a duplex receptacle assembly of the embodied invention.
Figures 8A, 8B:
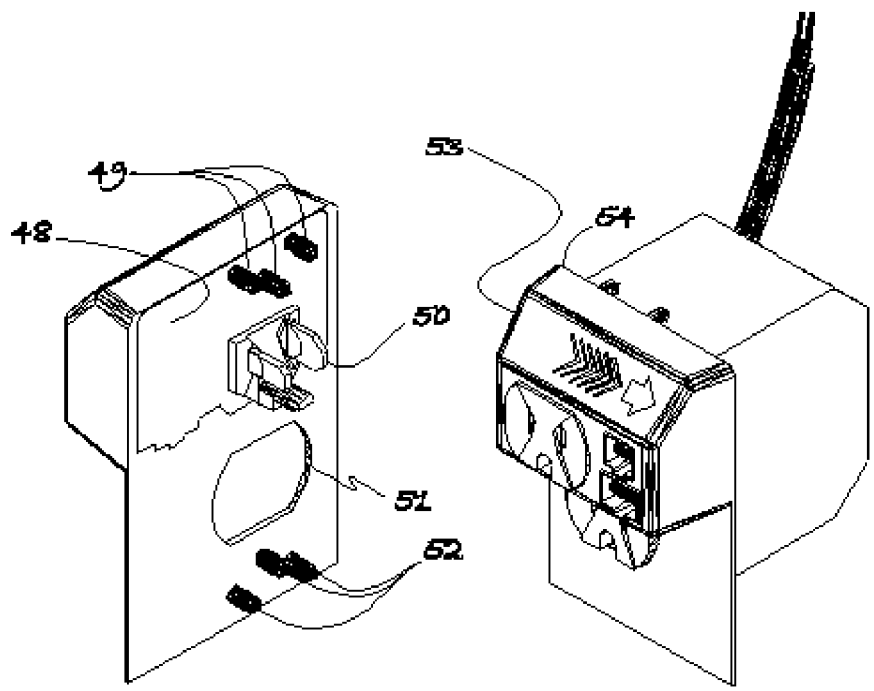
FIG. 8A: Is a rear view illustration of a snap-on assembly of the embodied invention.
FIG. 8B: Is a front view illustration of a snap-on assembly of the embodied invention.
Figure 9:
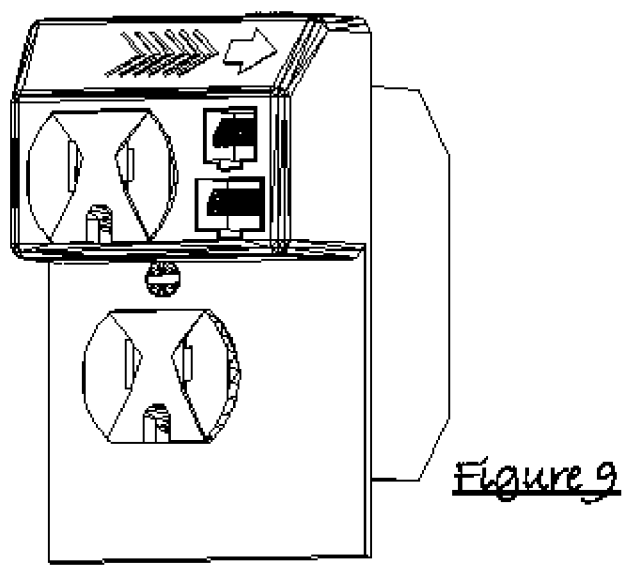
FIG. 9: Is a front view illustration of a screw-on assembly of the embodied invention.

FIG. 5 illustrates the insertion of a life-line support battery 36, a face plate illustration 32 with communication plug slots 34, power outlet slots 35 and holes that provide keyed access to the release clip 33. The access lid for the battery backup system, shown by example on the top 53, side 38, and front 37 of the faceplates, can be placed anywhere on the housing assembly. FIG. 6A, FIG. 6B, FIG. 7, FIG. 8A, FIG. 8B, and FIG. 9 illustrate several mechanical form factors that this invention may assume. FIG. 6A illustrates a typical stand-alone duplex power outlet embodiment of this invention with a matching duplex face plate 39 and top mounted access lid for the life line support battery 37. FIG. 6B illustrates a power outlet embodiment of this invention with multiple duplex receptacles with a matching faceplate 40 and side mounted access lid for the life line support battery 38. FIG. 8A and FIG. 8B illustrates a form factor that occupies only half of a conventional duplex power outlet receptacle 54 and a front mounted access lid for the life line support battery 53. These illustrations show that the this invention can assume any form factor and use any combination of upper, lower, left, right, and center receptacle in an outlet box. The device may include 1 or multiple receptacles of any type, including specialized outlets for dryers or other unique outlet types and foreign types of outlets. For example, if the original wall-box supplied conventional 110V 15 A duplex power, the same would be available on the outside of the housing of the device. The same applies for any and all other forms of outlets available.

The drawings in this disclosure are not intended to restrict the spirit of this invention, which encompasses any device that is intended to reduce the burden and cost of the task of coupling voice communications from a unit that houses voice communication support systems to existing telephone systems by wireless, plug-in, or other wired connection. A prominent feature that is encompassed by the spirit of this invention is that the apparatus does not require removal of any existing electrical device in the wall-box.

What is claimed is:

1. A wall-box mountable assembly comprising:
   (a) a back-plate that is mountable to any conventional single, duplex, or multiplex electrical wall-box,
   (b) an electrical connector and power supply transformer that is mounted to the back plate or any other part of the assembly and a plurality of power receptacle extensions on the device that plugs directly into any conventional single, duplex, or multiplex electrical receptacle and supplies power to the internal components and to a plurality of power receptacles that are accessible on the outside of the assembly;
   (c) multiple modular power-line communication interface cards and supporting electronic components mounted to the back-plate or any other part of the assembly;
   (d) an assembly having internal components and electronic hardware being mounted on the back plate or any other part of the assembly to support a battery back-up system;
   (e) a battery for back-up power that is able to connect to the assembly and electronic hardware to support the battery back-up system;

(f) a set of communication interface jacks that are mounted to the back plate or any other part of the assembly;

(g) an enclosing faceplate having a first plurality of openings for the outlet extensions and a second plurality of openings for said jacks;

(h) a removable faceplate that easily snaps on and off of the enclosing faceplate to provide access for installation and removal of said battery;

(I) a plurality of mounting devices and electronics to support antennas, acoustic transceivers, diodes, infrared sensors or other wireless communications systems for wireless communications between the box and any other device.

2. A wall box mountable assembly of the type in claim 1 and further comprising:

(a) a device on the enclosing face-plate that prevents an un-intended user from opening the device or from pulling the faceplate so that the faceplate can be accessed only by using a release key device through keyed access points;

(b) said enclosing faceplate of that can be snap mounted to clips that are mounted on the back-plate and can be removed by using a release pin through access points;

(c) said enclosing faceplate of that can be snap mounted to clips that are mounted on the back-plate and can be removed by pulling the unit off of the snap-on clips;

(d) the use of any chemical, rubber sealant, screws, snap-on mechanisms, barbed anchors, spring loaded elbow clamps, or any other mechanical means including pressure, heat, or chemical adhesion or any combination thereof to mount the back-plate to the outlet-box.

\* \* \* \* \*